J. C. EUBANK.
HARROW.
APPLICATION FILED APR. 22, 1910.
983,035.
Patented Jan. 31, 1911.
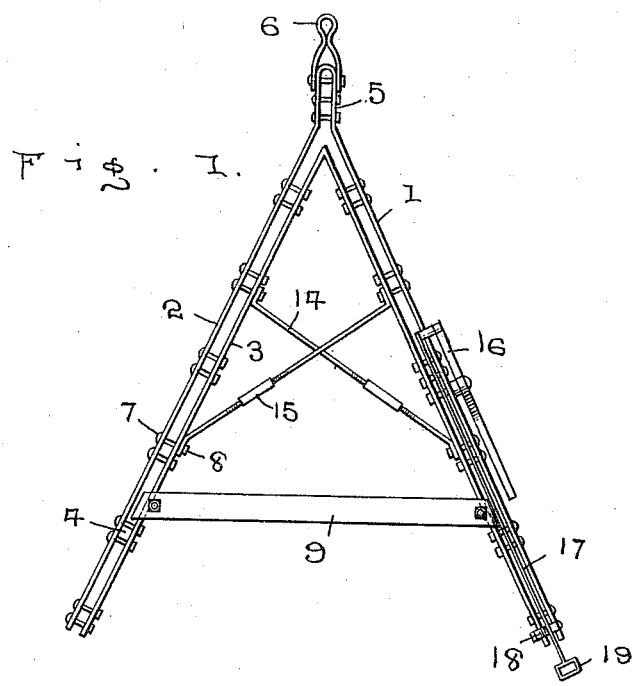
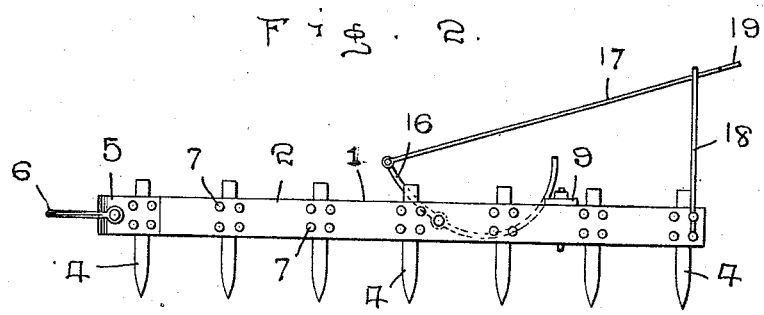
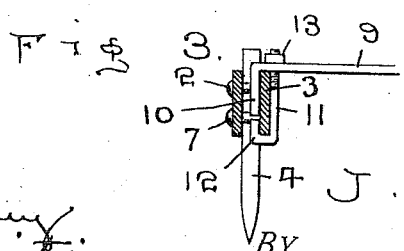
WITNESSES:
INVENTOR
J. C. Eubank
BY
W. J. FitzGerald & Co.
Attorneys

UNITED STATES PATENT OFFICE.

JOHN C. EUBANK, OF CANE VALLEY, KENTUCKY.

HARROW.

983,035.  Specification of Letters Patent.  Patented Jan. 31, 1911.

Application filed April 22, 1910. Serial No. 556,933.

*To all whom it may concern:*

Be it known that I, JOHN C. EUBANK, a citizen of the United States, residing at Cane Valley, in the county of Adair and State of Kentucky, have invented certain new and useful Improvements in Harrows; and I do hereby declare the following to be a full, clear, and exact description of the invention, such as will enable others skilled in the art to which it appertains to make and use the same.

My invention relates to new and useful improvements in harrows and my object is to provide a frame, which is preferably constructed entirely of metal.

A further object is to provide means for adjusting the bars of the frame, whereby the harrow may be widened or narrowed.

A further object is to provide suitable braces for the frame.

Other objects and advantages will be hereinafter referred to and more particularly pointed out in the specification and claims.

In the accompanying drawings which are made a part of this application, Figure 1 is a top plan view of the harrow. Fig. 2 is a side elevation thereof, and, Fig. 3 is a detail sectional view through one of the bars of the frame, the parts being shown on an enlarged scale.

Referring to the drawings in which similar reference numerals designate corresponding parts throughout the several views, 1 indicates the frame of the harrow, which is substantially A shaped in general outline, the bars of the frame being preferably constructed of two plates 2 and 3, which plates are arranged parallel with each other and are spaced apart to receive teeth 4. The plates 2 terminate at their apex in a stock 5, to which is attached a clevis 6 and by means of which one or more draft animals are hitched to the harrow. The teeth 4 are adjustably secured between the plates 2 and 3 by introducing bolts or the like 7 transversely through said plates and on opposite sides of the teeth and by firmly turning the nuts 8 on to the bolts 7, the teeth 4 will be firmly held in position between the plates. The plates 2 and 3 are sufficiently flexible to admit of lateral adjustment of the free ends of the plates, so that the width of the harrow may be increased or decreased, the side bars formed by the plates being held in their adjusted positions by means of a space bar 9, the ends of the space bar having depending extensions 10 which pass between the plates 2 and 3 and engage the inner faces of the plates 3. The space bar 9 is securely held in engagement with the plates 3 by means of clamp bolts 11, one end of the bolts being threaded and extended through the space bar, while the lower ends thereof are provided with hook terminals 12, which extend below and engage the plates 3, the threaded end of the bolts being provided with nuts 13, by means of which the clamp bolts may be firmly engaged with the space bar and plates 3. By this construction, it will be readily seen that when it is desired to increase or decrease the width of the harrow, the nuts 13 are to be loosened and the space bar shifted along the plates 3 until the side bars of the frame are properly adjusted, when the nuts are again tightened and the space bar firmly secured to the parts of the frame.

The side bars of the frame are firmly braced by extending brace rods 14 between the bars of the frame, said rods being preferably crossed, as shown, and having their ends attached to the plates 3 and by forming said brace rods in two sections and connecting them by means of turn buckles 15, said rods may be readily lengthened or shortened to coincide with the increased or decreased width of the harrow frame. As this form of harrow is dragged over the ground, the teeth will collect trash, etc., and in order to release the trash from the teeth without stopping the harrow, I provide a curved lever 16, which is pivoted in its length to the plate 2 and on the outer face thereof, the upper end of the curved lever having a pull rod 17 attached thereto, which extends to the rear end of the harrow and normally rests upon a standard 18, the rear end of the pull rod having a hand hold 19, whereby the same may be readily grasped when it is desired to operate the lever.

In operating the lever to raise the harrow frame, a rearward pull is given the rod 17, which will swing one end of the lever downwardly and into engagement with the earth's surface, thereby raising the teeth above the earth's surface a sufficient distance to free any trash or the like that may be adhering to the teeth. As soon as the harrow passes over the trash, the pull rod is released and the lever swung upwardly, thus again lowering the teeth into engagement with the soil.

In the present instance, I have shown but one of the curved levers and means for operating the same, but it will be readily understood that a lever may be placed at each side of the harrow frame if desired.

This form of harrow can be very cheaply constructed and at the same time be strong and durable and by attaching the teeth in the manner shown, various sized teeth may be used and adjusted vertically to cultivate the soil at different depths. It will likewise be seen that the frame of the harrow can be readily adjusted to increase or decrease the width thereof. It will further be seen that by providing the brace rods and attaching the space bar in the manner shown, the parts of the harrow will be properly braced and reinforced to withstand the severest strain and it will likewise be seen that by providing the curved lever, the harrow frame can be elevated at any time to release trash or the like from the harrow.

What I claim is:—

1. In a harrow, the combination with a frame, comprising parallel plates arranged in pairs and converging at one end, one set of plates terminating in a stock, of teeth for said frame, means to lock the teeth in engagement with the frame, a space bar having extensions at its ends adapted to project between the pairs of plates, means engaging one of each pair of plates and the space bar to lock the space bar in its adjusted position, and adjustable brace rods for said frame.

2. In a harrow, the combination with a frame formed of parallel plates spaced apart and teeth adjustably secured between said plates, of a space bar having depending extensions adapted to project between said plates, a clamp bolt having a hook terminal at one end adapted to engage one of said plates, the opposite end of the bolt extending through the space bar and a nut engaging the free end of the bolt adapted to lock the space bar and bolt in engagement with said plate.

In testimony whereof I have signed my name to this specification in the presence of two subscribing witnesses.

JOHN C. EUBANK.

Witnesses:
R. A. SUBLETT,
T. B. GRANT, Jr.